Aug. 6, 1935.  R. W. FRENCH  2,010,016
PIEZO ELECTRICAL OSCILLATION INDICATOR
Filed July 2, 1934
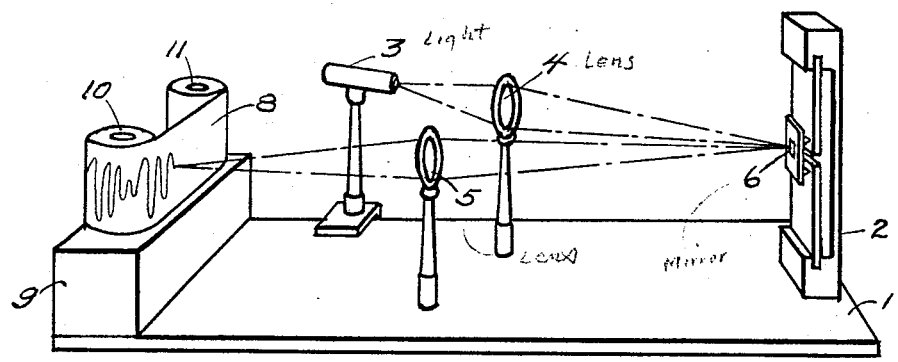
Fig. 1.
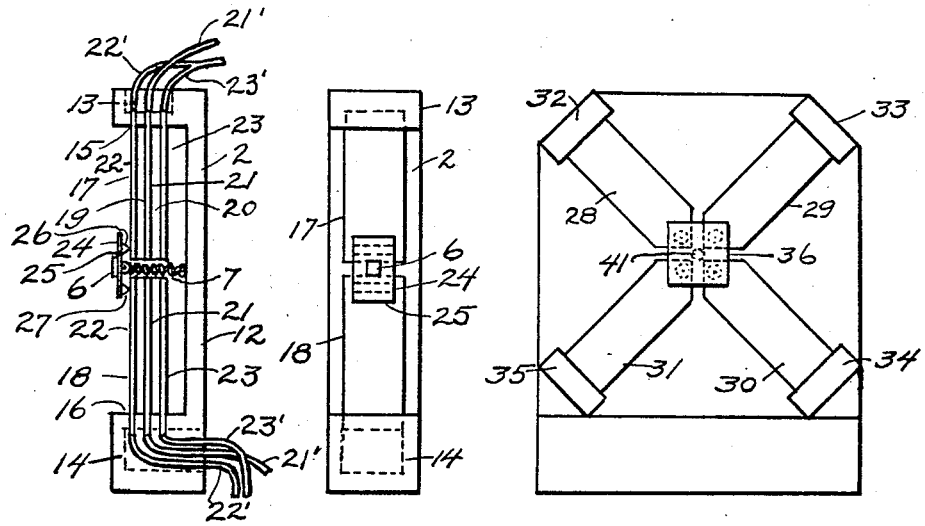
Fig. 2.  Fig. 3.  Fig. 5.
Fig. 4.  Fig. 6.
Inventor.
Ralph W. French.
By George L. Hue
Attorney.

UNITED STATES PATENT OFFICE 2,010,016

PIEZO-ELECTRICAL OSCILLATION INDICATOR

Ralph W. French, United States Army, Takoma Park, Md.

Application July 2, 1934, Serial No. 733,536

5 Claims. (Cl. 171—95)

(Granted under the act of March 3, 1883, as amended April 30, 1928; 370 O. G. 757)

This invention described herein may be manufactured and used by or for the Government for governmental purposes, without the payment to me of any royalty thereon.

This invention relates generally to an oscillograph for recording high frequency electrical oscillations, but more particularly to the oscillating apparatus associated therewith, and which operates by virtue of the piezo electrical effect.

The principal object of the invention is to provide an oscillating instrument of simple construction and economical to manufacture, which will accurately record wave forms of electrical oscillations, between a wide range of frequencies.

Another object of the invention is to construct an oscillating apparatus in which the inertia of the indicating element is reduced to a minimum.

Further objects will be apparent from the following description taken in connection with the accompanying drawing wherein—

Fig. 1 is a perspective view of the improved oscillator shown in connection with a standard form of oscillograph;

Fig. 2 is an enlarged side elevation of one type of piezo-electric oscillation responsive means in which two crystals are used;

Fig. 3 is an enlarged front view of the oscillation responsive device shown in Fig. 2;

Fig. 4 is a rear elevation of the mirror platform shown in Figs. 2 and 3;

Fig. 5 is a front plan view of a modified form of piezo-electric oscillation device in which four crystals are used, and Fig. 6 is a rear elevation of the mirror platform shown in Fig. 5.

In order to construct such an oscillator as set forth in the objects it has been the endeavor of the applicant to reduce the inertia of the moving elements to a minimum, and at the same time use an oscillation responsive means so sensitive and accurate that the exact fluctuations of current will be transmitted to the indicating element for reproduction on a moving film.

To accomplish these ends the applicant has resorted to the use of piezo-electric crystals as an oscillation responsive means, and by so doing was enabled to construct an indicating element, the mass of which is practically negligible.

The construction and arrangement of both these and other elements which go to make up this novel oscillator are set forth in detail in the following description and the accompanying drawing:

Referring particularly to Fig. 1, illustrating a type of oscillograph in which the improved oscillating apparatus may be used, the numeral (1) designates the base of the oscillograph, (2) the supporting bracket of the oscillating apparatus, (3) the light source and (4) and (5) lenses for converging the incident and reflected rays of light from the light source (3). The numeral (6) indicates the reflecting mirror, (7) the mirror retaining spring (see Fig. 2), (8) the recording film, and (9) the housing which contains a motor for rotating the film spools (10) and (11) to wind and rewind the film.

In the operation of the oscillograph, a beam of light from the light source (3) is projected through the lens (4) onto the mirror (6) and then reflected from the mirror (6) through the lens (5) onto the sensitized film (8) which is moved at a uniform velocity by a motor in the housing (9), thus producing a record of the oscillations imparted to the mirror by the oscillating mechanism.

Having generally described the structure and operation of the ordinary form of oscillograph in which the improved oscillating apparatus may be used, it will now be appropriate to consider the specific construction and operation of the latter device which forms the subject matter of this invention.

The oscillating apparatus comprises a frame or bracket (2) which is mounted upright on the base (1). The bracket is formed with a rear supporting wall (12) from which projects upper and lower grooved reed supporting members (13) and (14). Within the grooves (15) and (16) of these reed supporting members are fastened the reeds (17) and (18) composed of piezo-electric crystals. These reeds may be either adhesively attached within the grooves of the supports or detachably retained therein by thumb screws or any other suitable device.

The piezo electric crystals from which the vibrating reeds are formed and which are illustrated in detail in Figs. 2, 3, and 5 are constructed in the following manner:

Each vibratory unit consists of two sections (19) and (20) composed of clear homogeneous Rochelle salt crystals, cut with their major surfaces perpendicular to the a—axis and cemented together to form a single unit. An inner electrode (21) and two outer electrodes (22) and (23) are provided respectively with conductor leads (21'), (22'), and (23'), brought out for convenient connections to the radio receiving or amplifying apparatus or from whatever the oscillating current is derived, as shown in Fig. 2. These units are a standard article of manufacture and are utilized in the construction of loud speakers for radio apparatus.

By virtue of their piezo electrical properties and the manner of cutting and assembling the Rochelle salt crystals in the oscillating units, as set forth above, they are adapted to bending movements in alternate directions, corresponding with the longitudinal elongation and contraction of the crystalline plates and coincident with the directional flow of the current therein.

In Figs. 2, 3 and 4 is shown a type of oscillating mechanism in which only two crystalline reeds are used. These reeds are retained in the bracket (2) with their free ends adjacent each other and support a mirror platform (24) across the space intermediate the ends. The mirror platform (24) bridging the free extremities of these reeds (17) and (18) is held in contact therewith by a suitable spring (7).

The mirror platform (24) used with this type of apparatus may be constructed as shown in the above mentioned figures, that is, with a base (25) comprising a thin disc of aluminum or other light material having two parallel knife edge supports (26) and (27) which rest on adjacent extremities of each reed and are retained in this position by the spring (7) which is attached to the rear of the platform (24) and to the front of the supporting wall (12) of the bracket (2).

At the center of the outer surface of the platform (24) is cemented, or otherwise suitably secured thereto, a small mirror (6) for reflecting the beam of light from the source (3). In the construction of the platform (24) it is not necessary to use a separate mirror since the platform itself may be made of a material having reflecting properties or may be coated with such a material.

In Fig. 5 is shown a modified form of the oscillator constructed with four reeds (28), (29), (30) and (31) radially arranged about a center and at angles of 45 degrees to each other. These reeds are rigidly anchored in supports (32), (33), (34) and (35) at their outer extremities and pointed at their centrally directed free ends to provide for a closer assembling of the inner extremities, while still retaining sufficient intervening space between the reeds to permit free movement thereof, and also closer contact area for the supports of the mirror platform (36).

The mirror platform (36) used in this modified form of oscillator is similar in construction to that used in the oscillator having only two reeds, except in regard to the construction of the supports which in the latter case are preferably composed of four conical legs (37), (38), (39) and (40), each of which rests on one of the crystalline reeds, the platform being retained in position by a spring (41) similar in construction to the spring (7) and attached to the bracket and mirror platform in the same manner as this formerly mentioned spring.

In this modified form of oscillator the movement of the mirror corresponds to the resultant movement of the individual reeds on which the legs of the mirror platform rest. The modified form shows four of these reeds but the applicant does not wish to be restricted to this particular number, since the number of reeds may be varied to suit any particular construction for which the apparatus is designed and the platform may be varied in construction to adapt itself to the movement of the reeds without departing from the nature and scope of the invention.

Having described my invention, what I claim as new and wish to secure by Letters Patent is:

1. In a device for indicating the variable intensities of an electric current, a plurality of piezo electric crystalline reeds rigidly supported, in a single plane, at one end thereof with the free ends in opposed relation to each other, said reeds being capable of oscillation in their free portion and so wired to the source of current that with a flow in one direction the reeds, in opposed relation to each other, are moved in opposite directions and on reversal of the current flow the direction of movement of each reed is reversed, a platform mounted across the free extremity of said reeds, a spring for retaining the platform in said position, and a reflecting mirror mounted on said platform.

2. In a device for indicating the variable intensities of an electric current, a plurality of piezo electric crystalline reeds rigidly supported, in a single plane, at one end thereof with the free ends in opposed relation to each other, said reeds being capable of oscillation in their free portion and so wired to the source of current that with a flow in one direction the reeds, in opposed relation to each other, are moved in opposite directions from their common plane, and on reversal of the current flow the direction of movement of each reed is reversed, a platform mounted across the free extremities of said reeds, a spring connected at its extremities to the platform and a bracket adapted to retain the platform in its position across the extremities of the reeds.

3. In a device for indicating the variable intensities of an electric current, a plurality of piezo electric crystalline reeds rigidly supported, in a single plane, at one end thereof with the free ends in opposed relation to each other, said reeds being capable of oscillation in their free portion and so wired to the source of current that with a flow in one direction the reeds, in opposed relation to each other, are moved in opposite directions and on reversal of the current flow the direction of movement of each reed is reversed, a platform having parallel knife edge supports mounted across the free extremities of said reeds, a spring for retaining the platform in said position and a reflecting mirror mounted on said platform.

4. In a device for indicating the variable intensities of an electric current, a plurality of piezo electric crystalline reeds rigidly supported, in a single plane, at one end thereof with the free ends in opposed relation to each other, said reeds being capable of oscillation in their free portion and so wired to the source of current that with a flow in one direction the reeds, in opposed relation to each other, are moved in opposite directions and on reversal of the current flow the direction of movement of each reed is reversed, a platform, legs projecting from said platform, mounted on the free extremities of said reeds, a spring for retaining the platform in its position across the extremities of the reeds, and a reflecting mirror mounted on said platform.

5. In a device for indicating variable intensities of an electric current, a plurality of piezo electric crystalline reeds rigidly supported at one end thereof and lying in a single plane, with the free ends in opposed relation to each other, said reeds being capable of oscillation in their free portion, the character of their movement depending on the direction and intensity of the current, and means adapted to accommodate itself to the various movements of the reeds and combine the same into a resultant movement, and indicating means operated in unison with said first mentioned means.

RALPH W. FRENCH.